Patented Nov. 8, 1949

2,487,223

UNITED STATES PATENT OFFICE 2,487,223

ADHESIVE COMPOSITIONS

Martin Eli Cupery, Wilmington, Del., assignor to E. I. du Pont de Nemours & Company, Wilmington, Del., a corporation of Delaware No Drawing. Application December 20, 1944, Serial No. 569,103

1 Claim. (Cl. 260—73)

This invention relates to new initially thermoplastic, but eventually thermosetting adhesive compositions particularly suitable for the construction of laminated articles, especially plywood.

Synthetic thermosetting polymers are becoming increasingly more important as adhesives for the manufacture of laminated articles such as plywood. In the fabrication of molded or shaped articles, for example shaped plywood, it is essential that the adhesive initially show good thermoplasticity to allow proper forming of shaped articles and to dissipate residual strains and stresses in the structure before the adhesive is set up to produce a strong, thermally hardened bond. After curing, such bonds in the finished article must be free from plastic flow (cold flow) and should show complete resistance to water. In many applications it is desirable to apply the adhesive in the form of stable solutions having reasonably high solids content at workable viscosity ranges. Many commercial adhesive compositions of the thermosetting types are limited in their application because of their poor stability in solution on storage, or because the adhesive tends to partially cure at ordinary temperatures between the time of application and the fabrication of the article. Moreover, when such adhesives are employed in the manufacture of shaped articles having both flat surfaces and curved surfaces, the flat surfaces sometimes become firmly bonded before the curved surfaces have been properly formed, which results in a spreading of the wood veneer at the curved shapes. This type of defect is designated in the art as bridging.

This invention has as an object the provision of improved thermosetting, water-resistant, adhesive compositions. Another object is to obtain laminated structures, especially plywood compositions, having excellent dry and wet shear strengths. A further object is to provide an improved process for fabricating dimensionally stable, laminated structures having molded or shaped forms. Still another object is to provide adhesive compositions having satisfactory stability on prolonged storage. Other objects will appear hereinafter.

These objects are accomplished by the invention of thermosetting adhesive compositions comprising, preferably in solution in an inert organic solvent, formaldehyde, an acidic catalyst and a polyvinyl acetal of an aldehyde of from two to five carbon atoms, preferably polyvinyl butyral, said acetal having a hydroxyl number of 40–200; the use of the adhesive compositions in the fabrication of dimensionally stable laminated structures; and the improved laminated structures thus made.

In the preferred mode of utilizing the invention the polyvinyl acetal such as polyvinyl butyral, containing a low amount of free hydroxyl groups, is dissolved in a solvent such as methyl ethyl ketone and to the solution are added small amounts of formaldehyde and an acid substance, e. g., maleic acid. The composition is mixed well and then applied, by brushing, to the surfaces to be bonded. After air drying until the solvent has essentially evaporated the coated surfaces are placed in contact with each other and the entire assembly placed in a press and subjected to the action of heat according to conventional procedures. For example, several layers of plywood veneer, having adhesive applied to only the inner side of the outer veneers but to both sides of the center sandwich veneers, are placed in alternative crossgrain arrangement (i. e., the grain of each ply is at the right angles to that of the adjacent plies of wood) and the unit is then placed in a hydraulic press under pressure at the required temperature and for a suitable period of time until the adhesive has reacted to give a water insensitive, nonthermoplastic bond. Adjustments in the composition and the conditions of application or bonding can be made to suit a wide variety of uses for which these adhesives are especially suited. Certain such applications are illustrated in the following illustrative examples which are not to be regarded as the only ways of employing the invention.

*Example I*

The butyral of a low viscosity polyvinyl alcohol having a hydroxyl number of about 82 is dissolved in methyl ethyl ketone to give a solution of 15% solids concentration. To this solution is added aqueous formaldehyde (37% Formalin) to give a composition containing 12% formaldehyde based on the polyvinyl butyral. After mixing, p-toluenesulfonic acid is added in the amount to give a concentration of 1% based on polyvinyl butyral. The final solution is clear and homogeneous and has a viscosity of about 1.65 poises at 25° C. Upon storage at ordinary temperature this composition shows no increase in viscosity after standing for several months.

The adhesive solution is applied by brushing on each side of a standard birchwood core ply and on the core side of two standard birchwood veneer plies using about 9.2 lbs. adhesive solids per 1000 sq. ft. veneer surface. After drying for about one hour the plies were placed in the standard alternating crossgrain arrangement for fabricating plywood and bonded at 140° C. for a period of 20 minutes under a pressure of 200 pounds per square inch. Test strips prepared and tested according to the procedure described on page 71 of the United States Department of Agriculture Bulletin #1500, June 1929 (Riehle tester) had a dry shear strength of 418 lbs./sq. in. with about 60% wood failure. The same plywood after exposure to boiling water for three hours and testing while wet, has a shear strength of 290 lbs./sq. in with about 25% wood failure. Upon immersion in water at 25° C. for 48 hours, the plywood has a shear strength of 350 lbs./sq. in. with about 32% wood failure. Under the same conditions the unmodified polyvinyl butyral adhesive produces plywood having a dry shear strength lower than that of the plywood made from the adhesive of this invention. Upon exposing the plywood from the unmodified adhesive to water either at 25° C. or at elevated temperatures as in the above tests, the adhesive rapidly fails to the extent that zero shear strength is obtained.

A sheet of cellophane was coated on one side with a thin film of the composition of Example I. The cellulose sheet was air dried for 16 hours and cut into two pieces. One portion (total weight 0.9907 g.) was baked for 20 minutes at 135° C. while the other sheet (0.9742 g.) remained at room temperature. The two samples were placed in excess cuprammonium solution for 24 hours and the undissolved portion filtered on a glass sintered crucible. The residue was washed thoroughly with dilute ammonium hydroxide and water and dried in an oven at 120° C. for four hours. The baked sample weighed 0.2314 g. while the control weighed 0.2022 g. The residue left by the heated sample was equal to 23.5% of the original sheet as compared to 21% for the control. This is an increase of 12% by weight of the baked composition as compared to the control, thus showing reaction of the adhesive with the cellulose of the cellophane and union by chemical, rather than physical, action.

Example II

An adhesive composition is prepared by adding to a 15% solution of low viscosity, low hydroxyl number (about 80), polyvinyl butyral in methyl ethyl ketone, sufficient formaldehyde (37% Formalin) and maleic acid to give concentrations of 5% Formalin and 1% maleic acid, both based on polyvinyl butyral. The composition is applied by brushing to birchwood veneer at the rate of 4.4 lbs./1000 sq. ft. of veneer surface. After drying for about five hours three plies of veneer are placed together in alternate cross-grain arrangement, the inner ply having both sides coated with adhesive but the outer plies having only the inner side coated. The assembly is placed in a press and held under 200 lbs./sq. in. pressure for 20 minutes at a temperature of 140° C. The resulting plywood when tested as described in Example I has a dry shear strength of 554 lbs./sq. in. with 100% wood failure. After immersion in boiling water for three hours and tested wet the plywood has a shear strength of 406 lbs./sq. in. with 100% wood failure. The same polyvinyl butyral unmodified yields plywood having nearly the same dry shear strength but having zero shear strength after immersion in water at ordinary temperature for 48 hours.

Example III

To an ethanol solution containing 15% of medium viscosity polyvinyl butyral having a hydroxyl number of about 160 is added sufficient aqueous formaldehyde and solid maleic acid to give concentrations, respectively, of 15% and 1% based on polyvinyl butyral. The resulting composition has a viscosity of 65 poises at 25° C. The composition is applied by brushing to birchwood veneer to give a coating weight of 8.8 lbs. per 1000 sq. ft. of veneer surface. After air drying at room temperature for three hours, three plies of the veneer are assembled and bonded as described in Example I. The resulting plywood tested by the procedure of Example I using the standard Riehle tester, has a dry shear strength of 590 lbs./sq. in. with 100% wood failure. After exposure for three hours to boiling water and tested wet, the plywood has a shear strength of 460 lbs./sq. in. with 90% wood failure. The same plywood immersed in water at ordinary temperature for 48 hours has a shear strength of 467 lbs./sq. in. with 67% wood failure. The unmodified polyvinyl butyral under identical conditions yields plywood having nearly the same dry shear strength as given above, but such plywood has a zero shear strength after exposure to hot or cold water as described in the tests given above.

Example IV

An adhesive composition prepared as described in Example II may be applied, by brushing, to birchwood veneer at the rate of about 8.5 lbs. adhesive solids per 1000 sq. ft. of veneer surface, the inner strips of a ten-ply assembly being coated on both sides of the veneer, the outside strips being coated only on the inner side. After air drying for two hours, the ten strips may be assembled in alternating cross-grain arrangement and the unit then placed on a multiple, reverse-curve mold with temporary fastenings to hold the assembly in place, the assembly being placed in a rubber bag which is evacuated. Atmospheric pressure on the outside of the rubber bag will press the plies into place against each other and shape them to the mold. Then the entire assembly is placed in an autoclave where steam at a pressure of about 38 lbs./sq. in. (140° C.) is introduced and compressed air then introduced to bring the total pressure up to 55–70 lbs./sq. in., and the assembly left in the autoclave for a total period of 30 minutes, the first ten minutes of this period being required to bring the temperature to the desired level and the remaining heat treatment serving to cure the adhesive. At the end of this heating period the pressure can be released from the autoclave and the assembly removed.

The plywood will show uniformly complete bonding at both the flat and curved surfaces. Upon immersion in water for 48 hours no delamination or distortion of the shaped plywood will take place. The article will be dimensionally stable, showing no distortion on exposure to heat or when placed under continued strain. A shaped plywood prepared by the above procedure on the same mold by using a water-soluble, commercial phenol-formaldehyde resin adhesive will have good bonding at the flat surfaces but will show objectional bridging of the plies at the curved surfaces. When shaped plywood is made as above from unmodified polyvinyl butyral the mold must be cooled before the article is removed to avoid delamination from thermoplastic flow. Such articles also show gradual, permanent distortion (plastic flow) under continued stress and become delaminated after immersion for several hours in water.

*Example V*

The adhesive composition of Example III is applied to one side of 1/16 x 1 x 6 inch leather test strips and the strips allowed to air dry until the adhesive is nearly dry. The coated surfaces of two strips are placed in contact with each other and the unit placed in a press at about 30 lbs./sq. in. pressure for a period of 10 minutes. The bonded unit is then placed in an oven at 130° C. for one-half hour to cure the adhesive. The resulting article placed in water at ordinary temperature for 48 hours shows no delamination and upon separation of the two plies under tension gives complete leather failure at the bonding surface. In comparison with the above sample, similar test specimens prepared by an identical procedure from a sample of the same polyvinyl butyral but unmodified are more easily delaminated under tension and the failure in these specimens is due almost entirely to failure of the adhesive with only slight failure of the leather at the bonded surfaces.

The invention has been illustrated above in terms of the very greatly preferred polyvinyl butyral but the invention is generic to the use of polyvinyl acetals, of hydroxyl number of 40 to 200, of aldehydes of two to five carbon atoms including polyvinyl acetaldehyde acetals, polyvinyl acrolein acetals, polyvinyl crotonals, polyvinyl butyral, and polyvinyl furfuraldehyde acetals as well as polyvinyl acetals of a plurality of such aldehydes. In these acetals not more than 95% nor less than about 77% of the hydroxyl groups of the polyvinyl alcohols are reacted with the aldehyde. Such products known collectively as polyvinyl acetals, have hydroxyl numbers ranging from 40 to about 200. For optimum results and the preferred rate of cure, it is desirable to employ polyvinyl acetals in which 80 to 95% (hydroxyl numbers 171 to 40, respectively) of the hydroxyls of the polyvinyl alcohol are reacted with aldehyde. When low viscosity polyvinyl acetals are employed it is desirable to use products having approximately 90% (hydroxyl number 82) of the hydroxyl groups of the polyvinyl alcohol reacted with the aldehyde.

In the adhesive compositions of this invention formaldehyde is used because of its availability at low cost and because of its high chemical reactivity under the preferred conditions of bonding. With polyvinyl acetals of low hydroxyl number (40-100) concentrations of 2 to 15% of formaldehyde based on the polyvinyl acetal are preferably employed. However, lower or higher amounts may be employed if suitable adjustments in the bonding schedules (time, temperature and pressure) are made. Increased amounts of formaldehyde, e. g., above 20% based on polyvinyl acetal are not detrimental to the thermosetting reaction, but excessive amounts of free formaldehyde are obnoxious in commercial operations and wasteful of materials. Aldehydes other than formaldehyde are not desirable substitutes for formaldehyde since in general compositions including such aldehydes as acetaldehyde, butyraldehyde, crotonaldehyde, acrolein, benzaldehyde, furfural, and the like require higher bonding temperatures and increased amounts of acidic catalysts if adhesive bonds having suitable water resistance are desired.

The catalysts employed for the curing of the adhesives of this invention can be acids or acid-reacting salts. The preferred catalysts are acids having ionization constants equal to or greater than $1 \times 10^{-2}$ at 25° C. Acids having ionization constants of $2 \times 10^{-4}$ or even lower can be used but they are not as effective and require more vigorous conditions for curing the adhesive. Examples of suitable acids are maleic, p-toluenesulfonic, phosphoric, oxalic, sulfamic, hydrochloric and trichloroacetic acids. The preferred concentrations of these catalysts are from 0.05 to 10% of the weight of the polyvinyl acetal. When the adhesive is applied to wood it is desirable that the catalyst impart to the solution a pH of not less than about 3. Examples of salts which are effective as catalysts are ammonium chloride, monosodium phosphate, sodium bisulfate, or others having an acid reaction in aqueous solution. Acid esters such as ethyl acid phosphate, or ethyl acid sulfate can also be used.

In general the strong acids are effective in producing the infusible, nonthermoplastic resins at low temperatures if long periods of time are employed. However, if the salts of strong acids are employed, the composition is not cured at low temperatures even with long periods of time. Compositions containing these catalysts can be kept at room temperature without undergoing insolubilization. The compositions are cured at temperatures of above 100° C. or preferably about 140-150° C.

The adhesive compositions in general include a solvent. Any inert solvent may be employed. The solvent may include water as in the examples but in general an inert organic solvent for the acetal is required. Suitable organic solvents include dioxan, alcohols or ketones or mixtures of these solvents with hydrocarbons. Methyl ethyl ketone is an effective solvent especially for the butyrals of low viscosity polyvinyl alcohols. Such solutions of low viscosity polyvinyl butyrals have the advantage of high solids concentration at workable viscosity ranges, for example, in plywood preparations solutions containing from 18 to 20% polyvinyl butyral are well adapted to application by brushing or roller coating and single coat applications of the adhesive compositions are sufficient to give the coating weights desired. On the other hand, solutions of high viscosity grades of polyvinyl acetals normally cannot be used at more than about 15% solids so that multiple applications of the adhesive are often required in order to furnish the coating weights desired.

The adhesives of this invention are initially thermoplastic but upon exposure to the heat treatment they are readily set up to infusible, nonthermoplastic compositions. In general, temperatures of about 140° C. applied for periods of 15-30 minutes give complete curing of the adhesive. Lower temperatures of 100-120° C. are also effective if longer periods of heat exposure and/or increased catalyst concentrations are employed. When high concentrations of catalyst are used, for example, 10% based on polyvinyl acetal, the adhesive cures very slowly at ordinary temperatures but a curing period of several weeks is required before any appreciable resistance to water is observed. Bonding temperatures above 140° C. may be employed in combination with shorter bonding periods and/or lowered catalyst concentrations, but such conditions are normally not advantageous in commercial operations, such as in the fabrication of molded plywood.

The adhesives of this invention have the important advantage that they are initially thermoplastic so that, for example, in the manufacture of molded plywood, the strains and stresses which develop during the forming and heating operations can be dissipated throughout the structure, thereby avoiding cracking and spreading (bridging) of the veneer at the curved portions of the structure. When the adhesive becomes fully cured it has lost its plasticity and is not softened by heat. Furthermore, the cured adhesive is insensitive to water.

If desired, the adhesive compositions of this invention may be modified to include colors, fillers, extenders, pigments, resinous materials, and the like according to procedures known in the art. For example, walnut shell flour, mica powder, wood flour, or gums may be added to the adhesive composition. In certain cases the adhesive may be cast in the form of a dry, unsupported film and the resulting film then be used as the adhesive between laminae to be bonded together by conventional means. In another method of application the adhesive composition may be applied to paper or impregnated in paper or another suitable substrate, and the sheet in partially wet or dried form, be used as the adhesive substance for cementing articles to be bonded by any preferred procedure.

In addition to bonding wood or leather, other materials may be bonded with the adhesives of this invention, such as the following: paper; fabrics of cotton, wool, linen, rayon, silk, nylon, cellulose acetate, vinyl chloride polymers, casein and glass; rubber; metals, such as steel, aluminum, copper, magnesium and their alloys; plastics such as polystyrene, polymethyl methacrylate, polyvinyl chloride, polyvinyl acetals, cellulose derivatives, nylon, lignin plastics, and the like. Different materials may also be bonded together, such as: wool to metal, paper to metal, paper to wood, metal to glass, rubber to glass, rubber to metal, rubber to leather, nylon to leather, glass to wool, plastics to metal, plastics to wood, and various other combinations of such and other materials.

The bonding of the adhesives of this invention to hydroxyl-containing organic polymeric materials, such as polyvinyl alcohols, paper, wood, cellulosic textiles and regenerated cellulose is exceptionally good. As the aldehyde is effective in its reaction with polyvinyl acetals containing free hydroxyl groups it, possibly, also exerts a modifying reaction on the hydroxyl-containing substrate which results in better cohesive bonding between the modified polyvinyl acetal and substrate.

The above description and examples are intended to be illustrative only. Any modification therefrom which conforms to the spirit of the invention is intended to be included within the scope of the claims.

What is claimed is:

A thermosetting initially thermoplastic adhesive composition comprising, in solution in an inert solvent, formaldehyde, an acidic catalyst and a polyvinyl butyral having a hydroxyl number of 40–200.

MARTIN ELI CUPERY.

REFERENCES CITED

The following references are of record in the file of this patent:

UNITED STATES PATENTS

| Number | Name | Date |
| --- | --- | --- |
| 2,116,635 | Matheson | May 10, 1938 |
| 2,176,859 | Morrison | Oct. 17, 1939 |
| 2,179,051 | Morrison | Nov. 7, 1939 |
| 2,262,997 | Fordyce | Nov. 18, 1941 |
| 2,269,217 | McNally | Jan. 6, 1942 |
| 2,387,831 | Cogan | Oct. 30, 1945 |
| 2,396,098 | Haas | Mar. 5, 1946 |
| 2,405,983 | Sharkey | Aug. 20, 1946 |
| 2,436,433 | Jebens | Feb. 24, 1948 |

FOREIGN PATENTS

| Number | Country | Date |
| --- | --- | --- |
| 356,408 | Great Britain | Sept. 10, 1931 |
| 632,310 | Germany | July 6, 1936 |

OTHER REFERENCES

Richter: "Textbook of Organic Chemistry," John Wiley & Son (1943).